United States Patent
Ammer et al.

(10) Patent No.: US 11,397,245 B2
(45) Date of Patent: *Jul. 26, 2022

(54) SURVEYING INSTRUMENT FOR SCANNING AN OBJECT AND FOR PROJECTION OF INFORMATION

(71) Applicant: HEXAGON TECHNOLOGY CENTER GMBH, Heerbrugg (CH)

(72) Inventors: Thomas Ammer, Widnau (CH); Thomas Jensen, Rorschach (CH); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 745 days.

This patent is subject to a terminal disclaimer.

(21) Appl. No.: 16/118,299

(22) Filed: Aug. 30, 2018

(65) Prior Publication Data

US 2019/0064328 A1 Feb. 28, 2019

(30) Foreign Application Priority Data

Aug. 30, 2017 (EP) .................................... 17188568

(51) Int. Cl.
*G01S 7/481* (2006.01)
*G01S 17/42* (2006.01)
(Continued)

(52) U.S. Cl.
CPC .............. *G01S 7/4817* (2013.01); *G01C 1/02* (2013.01); *G01C 15/002* (2013.01);
(Continued)

(58) Field of Classification Search
CPC ........ G01S 7/4817; G01S 17/42; G01S 17/89; G01S 7/4814; G01S 17/88; G01S 17/86; G01C 15/002; G01C 1/02; G01C 15/004

(Continued)

(56) References Cited

U.S. PATENT DOCUMENTS 7,127,822 B2 * 10/2006 Kumagai ............. G01C 15/002
33/290
10,267,619 B2 4/2019 Tohme et al.
(Continued)

FOREIGN PATENT DOCUMENTS

CN 103076614 A 5/2013
CN 103245302 A 8/2013
(Continued)

OTHER PUBLICATIONS

"Parallax," Wikipedia, downloaded Apr. 22, 2021 from https://en.wikipedia.org/wiki/Parallax, 8 pages. (Year: 2021).*
(Continued)

*Primary Examiner* — Daniel L Murphy
(74) *Attorney, Agent, or Firm* — Maschoff Brennan

(57) ABSTRACT

Surveying device comprising a base defining a base axis (A), a support structure arranged to be rotatable around the base axis (A) and defining a rotation axis (B), a light emitting unit for emitting measuring signal and a light receiving unit comprising a detector for detecting reflected measuring signal. A rotation unit is mounted on the support structure for providing emission and reception of measuring light in defined directions, wherein the rotation unit comprises a rotation body which is mounted rotatable around the rotation axis (B) and the rotation body comprises a scanning mirror which is arranged tilted relative to the rotation axis (B). The device comprises at least one projector fixedly arranged with the support structure, defining a particular optical axis and configured to direct a light pattern at a scene, wherein position and shape of the pattern are controllable by the controlling and processing unit.

15 Claims, 4 Drawing Sheets

(51) Int. Cl.
  *G01S 17/89* (2020.01)
  *G01S 17/88* (2006.01)
  *G01C 15/00* (2006.01)
  *G01C 1/02* (2006.01)
  *G01S 17/86* (2020.01)

(52) U.S. Cl.
  CPC .......... *G01C 15/004* (2013.01); *G01S 7/4814* (2013.01); *G01S 17/42* (2013.01); *G01S 17/86* (2020.01); *G01S 17/88* (2013.01); *G01S 17/89* (2013.01)

(58) Field of Classification Search
  USPC ........................................................ 356/4.01
  See application file for complete search history.

(56) References Cited

U.S. PATENT DOCUMENTS

| | | | |
|---|---|---|---|
| 10,436,901 | B2 | 10/2019 | Baldischweiler et al. |
| 2006/0215176 | A1 | 9/2006 | Van Coppenolle et al. |
| 2012/0057174 | A1 | 3/2012 | Briggs |
| 2012/0070077 | A1 | 3/2012 | Ossig et al. |
| 2012/0249997 | A1* | 10/2012 | Matsumoto ........... G01S 7/4817 356/4.01 |
| 2013/0201488 | A1 | 8/2013 | Ishihara |
| 2014/0063489 | A1 | 3/2014 | Steffey et al. |
| 2015/0096181 | A1 | 4/2015 | Plangger et al. |
| 2015/0098075 | A1 | 4/2015 | Bestler et al. |
| 2016/0061954 | A1 | 3/2016 | Walsh et al. |
| 2016/0377722 | A1 | 12/2016 | Lardin et al. |
| 2017/0118457 | A1 | 4/2017 | Nygaard et al. |
| 2017/0219706 | A1 | 8/2017 | Baldishweiler et al. |
| 2017/0321857 | A1 | 11/2017 | Reisinger et al. |
| 2018/0238687 | A1 | 8/2018 | Toya et al. |

FOREIGN PATENT DOCUMENTS

| | | |
|---|---|---|
| CN | 104567668 A | 4/2015 |
| CN | 104567814 A | 4/2015 |
| CN | 105102926 A | 11/2015 |
| CN | 107076384 A | 8/2017 |
| CN | 108469618 A | 8/2018 |
| EP | 3203263 A1 | 8/2017 |
| EP | 3 226 029 A1 | 10/2017 |

OTHER PUBLICATIONS

The London Times, "The new dating lingo for 2021—and seven more trends to know," downloaded Oct. 11, 2021 form https://www.thetimes.co.uk/article/the-new-dating-lingo-for-2021-and-seven-more-trends-to-know-t62wtb8vx, four pages. (Year: 2021).*

European Search Report dated Feb. 28, 2018 as received in U.S. Appl. No. 17/188,568.

Tung-Hsien Tsai et al., "Calibration and analysis of eccentric error of the laser rotary-scanning measurement system," Measurement, vol. 45, Oct. 19, 2011, pp. 47-53.

Zexiao Xie et al., "Parameter calibration method of structured light self-scanning measurement system based on coplanar method," Chinese Journal of Lasers, vol. 43, No. 3, Mar. 31, 2016, pp. 0308003:1-8.

Qinghua Lu et al., "Research on size measurement of large-format ceramic floor tiles based on machine vision," Acta Optica Sinica, vol. 33, No. 3, Mar. 31, 2013, pp. 0312004:1-7.

* cited by examiner

SURVEYING INSTRUMENT FOR SCANNING AN OBJECT AND FOR PROJECTION OF INFORMATION

CROSS-REFERENCE TO RELATED APPLICATIONS

This application claims priority to European Patent Application No. 17188568.4 filed on Aug. 30, 2017. The foregoing patent application is incorporated herein by reference.

FIELD OF INVENTION

The present invention relates to a surveying device for scanning an object and projecting information.

BACKGROUND

Laser scanning is used to survey many different settings such as construction sites, building facades, industrial facilities, interior of houses, or any other applicable setting. The laser scans achieved therewith may be used to obtain accurate three-dimensional (3D) models of a setting, wherein the models consist of a point cloud. The points of such a cloud are stored by coordinates in a coordinate system, which may be defined by the laser scanning device that had recorded the point cloud. Usually, the laser scanner constitutes the origin of the coordinate system by a unit that sends out the scanning beams, in particular by the nodal point of the scanner. The points are surveyed by associating a distance measured with the scanning beam (for example, with a time-of-flight method) and the alignment under which the distance was measured. Usually, the coordinate system is a spherical coordinate system, so that a point can be characterized by a distance value, an elevation angle and an azimuth angle with reference to the origin of the coordinate system.

Common laser scanners comprise a unit for sending out a scanning beam and for receiving a reflected light signal in order to measure the distance of a point the beam was directed at. Usually, these scanners furthermore comprise means to rotatably alter the direction of the beams, commonly a vertical rotation axis (scanning axis) and a horizontal rotation axis (base axis), of which one may be a slow axis and the other one may be a fast axis, wherein both axes can be sensed with angle sensors. The rotation of the vertical axis may be associated with an azimuth angle and the rotation of the horizontal axis may be associated with an elevation angle.

The distances may be calculated with the travel time measurement (time-of-flight) method by observing the time between sending out and receiving a signal. Another possible method could be to measure the phase delay between sent and received signal. The alignment angles can be achieved with said angle sensors arranged at the vertical axis and at the horizontal axis. Another possible method could be to derive the angles from the known constant rotation speed of the axes, a point of reference, and the sampling rate of the distance measurements.

Another means to document the environment is to acquire a panorama or full-dome image of the settings. Such an image can provide a more intuitive visualization than a point cloud or a different visualization of the environment when the image sensors capture a different spectrum than the visible one, e.g. with thermal cameras. In general, such a panorama or full-dome image is used to digitally colourise the point cloud for a more ergonomic visualization. In various applications, terrestrial laser scanning is hence supported by imaging data of a camera which is combined with a laser scanner by including them in the laser scanner instrument or mounting them on the same platform as the laser scanner instrument.

Such is known in prior art and for example described in US20140063489A1, US2016061954A1 and US20120070077A1.

Particularly at construction sites, designers and construction workers are more and more reliant on visual support in form of augmented reality equipment or projection means. Such visually supporting functionalities are typically provided by stand-alone devices, which need to be manually aligned, positioned and/or referenced relative to the site or other working devices. Furthermore, merely simple screening information are provided by such devices known from prior art. Such information may be points of light or level information in form of lines of light, each manually pointed at desired spots.

Projection of information is typically limited to a comparatively narrow field of view of a respective projector. Moreover, reliability of accurate positional projection over the entire field of view may become a problem because of a given offset (parallax) between an axis of projection and a measuring axis of a scanning device. Consistency between a measured point and a projected point may thus be not guaranteed.

BRIEF DESCRIPTION

It is therefore an object of some embodiments of the present invention to provide an improved laser scanner with an extended field of application.

It is a further object of some embodiments of the invention to provide a laser scanner with improved user-friendliness and precision.

It is yet another object of some embodiments of the invention to provide an integrated laser scanner which is enabled to resolve possible offset errors.

These objects are achieved by the realisation of the features of the independent claims. Features which further develop the invention in an alternative or advantageous manner are described in the dependent patent claims.

If a projector and a laser scanner do not share a single projective centre, then a parallax is introduced.

As a consequence an incorrect projection of structured information may happen. The parallax effect takes place at regions where the projector "looks" under a different angle than the scanner to a certain object point and therefore "sees" this point at a different 3D-position, than the scanner "sees" it. Additionally, there may be points "seen" by the scanner, but not by the projector (e.g. due to obstructions)—or vice versa, which would result in an incomplete projection.

The laser scanner according to some embodiments of the invention allows a user to receive relevant information, e.g. to simplify a construction workflow and increase the accuracy of construction steps. Provided is an automatic projection of visual information onto a scene, object or room surface with no manual adjustment needed from the user.

The amount, shape, and the size of information that is projected onto the scene surfaces are limited by the field of view (projection angle) of the projector. To cure this limitation, the invention proposes the use of at least one additionally provided deflection surface which cooperates with a respective projector. The projector provides projection of a light pattern, the shape, and the size of which can be adapted by respective controlling of the projector.

Such projectors are known from prior art. The projector may be a conventional digital projector (beamer) with LC-filter, MEMS-Mirror array or a monochromatic or polychromatic laser projector. Laser projectors may realise a very compact size (also referred to as pico projectors) and allow for structured lighting of a customizable laser point matrix within a projection pyramid. The projection is sharp at any projection distance, therefore supplementary optics for adjusting the focus are not necessary. With a selection of single pixels (points) any light pattern is realisable, wherein pixel density decreases the longer the distance between projector and projection surface is. Monochromatic laser projectors provide even higher contrast than polychromatic projectors do.

Physical steering of the projector and/or a controlling of the screened pixel matrix allow for a directed positioning of a laser light pattern. With help of angle sensors the laser scanner is configured to always keep track of the position and alignment of its (rotating) components.

For the purpose of a projection of a specifically situated light pattern correlated to the given geometry at a scene—that is for example the marking of a room wall at exactly this position behind which an electric cable is laid, a laser scanner according to the invention may at least have one scan (a three-dimensional point cloud) stored on itself or on a controller, and a designed model of the pattern intended to screen on the scene, wherein the designed model is manually or automatically or semi-automatically implemented into the virtual 3D-model of the scene (which is derived from the point cloud generated by the laser scanner). The implementation may e.g. be done with a personal computer, wherein the ultimately combined model (point cloud+projection data) is again stored on the laser scanner.

If the scanner meanwhile has changed its position and/or orientation—e.g. after taking it to office for the data implementation and positioning it the next day at a position differing from where the scan has taken place—a further scan of the scene can be applied by the laser scanner. In this case, two scans (point clouds) of the scene exist and these two models are now referenced to each other, for example by the matching of certain (recognised) features. By the calculated differences regarding distance and orientation between the two models, a conclusion is made where to screen the pattern which is linked to the "initial" model. That way, projection of the information may automatically be adjusted to the position of the scanner.

The projection data implemented into the initial model and to be projected with the projector at the scene may for example be objects, textual information, markings and animations.

The scene may for example be a construction site, building facade or a decorated room.

The scanner according to some embodiments of the invention has a laser projector and is designed to project relevant data onto a (previously scanned) scene.

The controlling of the axes components, the controlling of the measurement process, the storing of the point cloud and the controlling of the projection may all be provided for example by at least one computer unit inside the laser scanner.

Some embodiments of the present invention are based on the idea of providing a less complex and comparatively low cost solution of basically or quasi parallax-free pattern projection with e.g. a laser scanner or any other surveying device. One main element of such solution is a particular design of the rotator of a laser scanner. Such rotation unit and its rotation body are equipped with one or a plurality of deflecting surfaces (in addition to a scanning mirror which is also provided with the rotation body). A projector which is assigned to the deflecting surface is arranged at a support structure of the scanner and thus is fixed relative to the rotation body.

These two components—the rotation body and the projector—are arranged and designed so that the projection axis and therefore the field of view of the projector is deflected and defined by the deflecting surface in defined manner to provide pattern projection as if the exit pupil of the projector is quasi identical with the nodal point of the laser scanner. Such deflection can be provided in (only) one particular region or angle of alignment (orientation) of the rotation body around the scanning axis. This means, the rotation body is controlled to be orientated into such defined alignment and projection of a defined pattern or sequence can be performed in this state or—for an increased field of projection—by rotating or swivelling the support structure around the base axis while keeping the rotation angle for the rotation body constant.

In other words, some embodiments of the invention relate to a surveying device, in particular a geodetic surveying device like a laser scanner, which comprises a base which defines a (elevation) base axis and a support structure (e.g. scanner frame) which is arranged to be rotatable around the base axis and which defines a (azimuth) rotation axis which is oriented basically orthogonal relative to the base axis. The surveying device further comprises an emitting unit, in particular a laser diode, for emitting a measuring signal (measuring laser beam), a receiving unit comprising a (photosensitive) detector for detecting reflected measuring signal and a rotation unit mounted on the support structure for providing emission and reception of the measuring signal in defined directions. The rotation unit comprises a rotation body which is mounted rotatable around the rotation axis.

The rotation body comprises at least one reflecting scanning mirror which is arranged tilted relative to the rotation axis (the rotation axis extends neither perpendicular nor parallel through a (flat) scanning surface of the scanning mirror) and provides defined deflection of the measuring signal. A controlling and processing unit is provided as well.

According to some embodiments of the invention, the surveying device comprises at least one projector fixedly arranged with the support structure, in particular inside of the support structure, defining a particular optical axis and configured to direct a defined light pattern at a scene, wherein position and shape of the pattern are controllable by the controlling and processing unit.

The rotation body comprises at least one deflecting surface different and spatially separated from the scanning mirror. The at least one projector and the rotation body are designed so and arranged relative to each other so that only in a predetermined range of alignment (angular orientation) of the rotation body around the rotation axis the optical axis of the at least one projector is deflected by the at least one deflecting surface and a field of view of the at least one projector is deflected and defined by the deflection of the optical axis so that the field of view comprises a defined field angle around the rotation axis (e.g. a comparatively large field angle). By that, basically parallax-free light pattern projection is providable with the surveying device (by means of the projector in cooperation with a respective deflecting surface), in particular wherein the light pattern is projectable as if the exit pupil of the at least one projector appears identical with a nodal point of the surveying device.

A comparatively large field angle in the plane at least basically orthogonal to (or inclined in defined manner relative to) the rotation axis of the rotation body may relate in particular to a significantly smaller field angle in a plane parallel to the rotation axis of the surveying instrument. Hence, there may be provided a field of view with an elevation field angle larger than an azimuth field angle.

Therefore, the surveying instrument according to some embodiments of the invention enables to bring and hold the rotation body in a well defined and known orientation, e.g. so that the rotation body provides a defined rotation angle around the rotation (scanning) axis, and by that enabling the projector to "see" at least part of the scanning region (in particular referring to the azimuth scanning direction) which can be measured by means of scanning with the measuring light. A particular arrangement of projector and deflecting surface and a particular design of the rotation body can also provide that respective projections are generated as if the exit pupil of the projector is located in or very close to the nodal point of the surveying instrument and thus results in parallax-free or quasi-parallax-free pattern projection.

In context of the present invention, the term "parallax-free" is considered to enclose every such embodiment, wherein due to the structural design and arrangement of rotator, deflection surface and projector, a resulting projection of a light pattern can be generated as if the projection centre (or pupil of the projector) was basically consistent with the nodal point of the scanner or differs from that nodal point to a minor degree. A small parallax of e.g. 5 mm is still considered as a "quasi parallax-free" system and still provides basically the advantages mentioned above. The terms "quasi parallax-free" and "parallax-free" here are used in synonymous manner.

A laser scanner according to some embodiments of the invention may be utilised in the following exemplary workflow: In a first step, a scan of at least a part of a room scene is performed with a laser scanner according to the invention. Once the scan is completed, a three dimensional point cloud of said part of the room is created, which may be transformed into a CAD (computer aided design) model. Optionally, fitting of surfaces that are flat or of pipes may be performed in order to simplify the model.

Associated with the scan, the laser scanner may reference its position by surveying a reference object (e.g. a reference target or prism), wherein the surveying may be done by scanning with the laser, by stereoscopic referencing, or by camera imaging (according equipment provided, like e.g. two sensors or cameras may be used to detect reference points), providing that the reference object remains in a position fixed to the scene at least until the last step of the exemplary workflow is finished. Self referencing of the laser scanner may as well be realised by fitting the scanned point cloud with a stored reference point cloud or a stored 3D model.

After the surveying of the room scene, and said optional referencing step is done, the laser scanner may be moved away and abandon its position. If a reference object has been used in the referencing step, the reference object should stay at its position.

In a second step of the exemplary workflow, information (e.g. 3D objects; position points or outlines of certain features; order and/or description of construction steps) may be imported into or added to the CAD model created from the 3D point cloud. This second step may be taken directly at the scene with help of a tablet or laptop computer, or remote from the scene in the surveyor's office at a later date. The extended CAD model is now an "augmented" model and may be saved as a new data file and transferred back to the laser scanner. In the CAD software programme, the augmented CAD model including the virtual objects or information may be previewed three-dimensionally and validated on the computer.

In a third step, the scanner is positioned back at the room scene. Where an optical accessibility of at least part of the scanned scene must be provided to the laser scanner, the exact position of the laser scanner is not crucial. If referencing as described above was performed, the laser scanner now may again reference its position in the same said manner and automatically recalculate the surveyed 3D point cloud in distance and alignment from its new standpoint. If referencing as described above was not performed (since it is optional), a point cloud comparison may be applied, by which—virtually—the scene itself is the reference object. This is done by comparing the initial point cloud to the point cloud from the further scan, and automatically detecting common features in order to determine the new coordinates of the new position of the scanner. For this, a full (in the same scope as before) scan of the scene is performed. After the point cloud has been achieved, a matching of the first and the second point cloud with regard to position and orientation may be calculated. Or in other words, the new position of the laser scanner is determined.

In a fourth step, the information added to the 3D model is processed regarding the predetermined positions on the surfaces of the room. The relative position of the scanner within the room and the parameters (coordinates) to project the information onto the surfaces within the room are computed. The adjustment calculation may be performed in the scanner or externally on a secondary computer device connected to the scanner or e.g. by sending the data to a cloud computer. An instruction set is then computed in the scanner (or calculated by the cloud computer and sent to the scanner) to define the adjusted projection for the laser projector.

In a fifth step, the information added to the 3D model is projected at their predetermined positions on the surfaces of the room. Hereby, the computed parameters and the instruction set are used. The projected information may e.g. include: drill points with or without information nearby the drill points (for example, diameter, depth etc.); level information; position and type of piping in walls; object renditions, such as object outlines, furniture, staircases, fixings etc. The projected information may as well include animations or videos showing construction steps, position of sunlight, user instructions etc. For projection, the rotator of the scanner is oriented to deflect the projection axis to project the pattern at a designated area.

Using the workflow described above, a complex set of information can be projected onto surfaces of a room, thereby creating an augmented reality projection of the positions of different features. The projection is automatically corrected for a differing position of the scanner.

The size of the projection may be limited by the projection angle of the laser projector (projection pyramid). To increase the size of the projection, the rotation within defined limits of the deflecting surface may additionally be used in combination with a frequented projection in order to extend the angle of projection (swivelling).

A monitoring system may be implemented to verify that construction steps have been performed correctly. For this purpose, a camera for object recognition may be used in order to verify the correct placement of objects within the room. The camera detects the projections onto the scene and checks within an algorithm if the projections match the as-built placement of e.g. drill holes, markings, etc.

According to an embodiment the rotation body and the at least one projector (and the emitting unit) are arranged and designed so that an emission axis for the measuring signal and the deflected optical axis of the at least one projector lie in a common plane which is oriented at least basically orthogonal to the rotation axis. A direction of the emission axis of a measuring laser beam may be defined by an orientation of the scanning mirror relative to the rotation axis. Typically, the emission axis is oriented orthogonal relative to the rotation axis. A direction of the optical axis for projection thus may differ by a defined angle (e.g. 60°, 90° or more than 90°) around the rotation axis.

According to an embodiment of the invention, the surveying device comprises at least two projectors which are fixedly arranged on the scanner frame, each projector defining a particular optical axis, and the rotation body comprises at least two adjacent deflecting surfaces. The at least two deflecting surfaces are arranged tilted relative to each other, in particular so that each of the deflecting surfaces lies on a different lateral face of a virtual polygonal pyramid defined by the orientations of the deflecting surfaces. Moreover, each of the at least two projectors is assigned to one particular deflecting surface of the at least two deflecting surfaces so that at least two pairs of one of the projectors and one of the deflecting surfaces are provided. In other words, each projector is assigned to exactly one of the deflecting surfaces, wherein—the other way round—each deflecting surface is assigned to exactly one projector. Each projector-surface-pair has its particular projector and deflecting surface. In addition, the projectors and the rotation body are designed so and arranged relative to each other so that in the predetermined range of alignment of the rotation body around the rotation axis a combined and continuous wide-angle field of view around the rotation axis or with reference to the plane at least basically orthogonal to or inclined in defined manner relative to the rotation axis, in particular with reference to an angle of rotation of the rotation body, in particular with reference to an elevation angle, is provided (by respective deflections by the deflecting surfaces).

The pairs of projectors and deflecting surfaces produce one extended field of view which is composed by individual sub-fields of view which are provided by each particular projector-surface-pair. The projectors and the deflecting surfaces are preferably designed so that the individual fields of view overlap to some extent regarding the elevation angle. Thus, there is one continued field angle of pattern projection with an angular limitation given by the two sub-fields of view.

For instance, by use of such arrangement of two projectors a quasi full-dome projection onto a setting can be generated by swiveling the scanner frame around the base axis.

Of course, pattern projection can be provided in a manner so that there results one continued projection generated by more than one projector. E.g. matching, blending and composition (e.g. stitching) of several sub-patterns may be performed according to approaches well known in the art.

According to a particular embodiment of the invention, the surveying device comprises three or more projectors and the rotation body comprises three or more deflecting surfaces, wherein each projector is assigned to one of the deflecting surfaces so that three or more respective projector-surface-pairs are provided, each pair comprising one of the projectors and one of the deflecting surfaces (in the predetermined range or state of alignment). A combined and continued wide-angle field of view with reference to a rotation angle around the rotation axis, e.g. in the plane basically orthogonal or inclined in defined manner relative to the rotation axis, is provided by these three or more pairs.

By use of three pairs of projectors and deflecting surface the field of projection which can be covered is extendable so that the field of projection in elevation direction covers up to half of the solid angle and thus enabled to generate a full-dome projection by swivelling or rotating the support structure around the (vertical) base axis by 360° while angle-dependently projecting a pattern. The provided elevation angle of the total field of view may be designed so that a base region of the field of view, i.e. an angular range which would provide projection onto the base of the surveying instrument, is excluded. The total field of view thus can be smaller than half of the solid angle, i.e. <180°, wherein still a suitable full dome projection can be provided.

In particular, the (continued wide-angle) field of view or projection covers an angle of at least 90°, in particular 120° or 150°, around the rotation axis (elevation angle). This would still include a vertical up angle basically corresponding to a direction of the base axis, wherein a region in down direction which would be hidden by the structure of the surveying device (also for scanning measurements) anyway is not covered by the wide-angle field of view.

The at least two deflecting surfaces or the three deflecting surfaces can be arranged with defined distance, in particular gap, between two successively arranged adjacent deflecting surfaces. Alternatively, the surfaces can be designed so that there is no gap in-between.

In case that there is no gap between two adjacent and successively arranged deflecting surfaces in theory a totally parallax-free design can be provided. However, a difference between the device's nodal point and the intersection points (projection centres) of the particular fields of view may occur. Moreover, the projector which defines a first field of view may project marginal rays in the second field of view.

In an alternative, if a defined gap is provided between two adjacent deflecting surfaces, there can be a clear separation of the particular fields of view. A small parallax may be provided by adapting a distance between the respective projectors entrance pupils and the mirrors. The gap can be kept comparatively small in order to still provide a quasi-parallax-free design, wherein the minor parallax can be neglected in the course of projection and further processing of projection data.

In one embodiment the rotation body may comprise one deflecting surface and the support structure comprises one projector and one camera. Here, the rotation body may be brought in at least two defined rotation positions within the predetermined rotation alignment so that in a first such position an optical axis of the projector and in second such position an optical axis of the camera is deflected. This setup can provide both parallax-free image acquisition and parallax-free pattern projection via the rotation body.

According to an embodiment of the invention each of the fields of view which is defined by a deflection by means of the assigned deflecting surface—in the predetermined alignment range—partly covers the combined wide-angle field of view, wherein an overlap of adjacent fields of view is provided, in particular wherein an overlapping region of the adjacent fields of view is defined by the field angles of the adjacent fields of view.

In one embodiment, the controlling and processing unit provides a projection functionality which is configured so that each of the at least one projector projects at least a part of the entire light pattern, wherein the rotation body is in the predetermined range of alignment. More particular, the projection functionality can be configured so that the pattern is projected while rotating the rotation body.

The controlling and processing unit can be configured to control a step of rotating the rotation body around the rotation axis so that the rotation body is brought (and held) in the predetermined range of alignment. Such controlled rotation may be initiated as a pre-step of pattern projection on a object or scene.

According to an embodiment of the invention the projectors and the rotation body are designed so and arranged relative to each other so that in the predetermined range or state of alignment of the rotation body, e.g. in a defined angular orientation of the rotation body, optical distances from each of the deflecting surfaces to respective exit pupils of the respectively assigned projectors are basically equal. Such design can provide particular equal centres of projection for the pattern to be projected.

Furthermore, the at least one projector and the rotation body can be designed so and arranged relative to each other so that in the predetermined range of alignment of the rotation body an optical distance from at least one of the deflecting surfaces to a respective exit pupil of the at least one projector along the optical axis of this projector basically corresponds to an optical distance from an intersection point of the optical axis with the deflecting surfaces to a nodal point of the surveying device, in particular wherein the nodal point is a point of intersection of the rotation axis of the rotation body (fast scan axis) and the vertical axis of the instrument (slow scan axis). A scanner-related virtual emission origin of the distance measurement radiation may be understood as the nodal point. That specific design provides that the projector(s) are placed like their entrance pupils or centres of projection are (basically) identical with the nodal point of the surveying device from a projection point of view.

The exit pupils or centres of projection of the projectors are thus positioned virtually in the nodal point of the system. In other words, each distance to an exit pupil of all fields of view (defined by the projectors and respective deflecting surfaces) coincide with the distance to the intersection point of a horizontal and vertical axis of the surveying device (nodal point). By that, a parallax free projection of a light pattern can be provided.

As a result the multiple projectors can be seen as one particular projector which has virtually one single projective centre. This centre virtually coincides with the nodal point of the surveying device that may be embodied as a laser scanner.

Referring to particular embodiments of the deflecting surfaces at least one of the deflecting surfaces can be provided by a reflecting mirror, wherein the reflecting mirror is provided by one planar surface of the rotation body, wherein the planar surface is formed, in particular milled and/or polished, as one part with the rotation body. Hence, the mirrors can be milled or turned into a monolithic rotor (rotation body). To get the exit pupil of the projector inside the frame (support structure) of a scanner the mirrors need a large distance from the intersection point of the axis (nodal point) due to the provision of having no parallax. Therefore the rotor gets bigger as known from prior art.

Alternatively, the reflecting mirror is provided as a separate mirror element attached, in particular glued, to the rotation body.

According to an embodiment of realising at least one of the deflecting surfaces, at least one of the deflecting surfaces is provided by a coated mirror surface of a prismatic element, wherein the prismatic element is attached to the rotation body. In particular, the prismatic element is embodied as a prism, in particular a polygonal prism. Preferably, the prismatic element is composed by at least two optical portions, wherein each of which provides particular optical properties. The optical portions can be represented by respective glass bodies with defined refractive indices. The optical portions (prism elements) may be of different densities or of a combination of appropriate air-gap and solid optic element.

The prismatic element may be attached by gluing or clamping onto/to the rotation body.

In particular, the prismatic element is formed out of material having a density basically corresponding to a density of the material the rotation body is formed out of. Alternatively or additionally, the prismatic element is formed out of material having a refractive index n significant greater than the refractive index n of air or vacuum, in particular wherein n>1.4.

Above properties provide easy integration or combination of the prismatic element with the rotation body. By having at least similar densities, weight distribution over the entire rotor is improved. A refractive index n>1.4 may provide artificial extension of the optical distance between the projector and the deflecting surface which leads to a much more compact design of the rotation body because the distance between the nodal point and the deflecting surface can be built shorter than the distance between the deflecting surface and the projector.

Furthermore, parts of the projector optics, in particular the front lens, can be integrated in the rotor to better adjust the location of the entrance pupil.

In one embodiment the at least one deflection surface is provided by a hyperbolic mirror.

Preferably, the rotation body is designed so that the scanning mirror faces in opposite direction of at least one of the at least one deflecting surfaces.

The rotation body can also be designed so that the scanning mirror is arranged on a front side of the rotation body and the deflecting surfaces are arranged on the backside of the rotation body.

According to an embodiment, the rotation body is arranged in a cylindrical cover which is designed to provide at least a first transmission window for emission and reception of the measuring light and a second transmission window for projection of light for pattern projection by the at least one projectors. Such cover can help holding the prismatic element in defined position relative to the rotation body and may additionally protect the optical elements and the projectors from environmental influences. Furthermore, surfaces of the glass prism can be easily cleaned in case of contamination. The outside angle between the prisms is uncritical regarding injury or safety aspects.

In context of the present invention, the predetermined state of alignment may be provided with only one particular rotation region around the rotation axis, in particular with only one particular rotation angle.

In one embodiment of the invention the projector can be realised as a digital projector, a monochromatic laser projector or as a polychromatic laser projector.

The projector may comprise a laser source and an optical element generating a laser dot matrix as light pattern.

The projector may in one embodiment comprise a laser source and an optical matrix element or a continuously deflecting element generating a light pattern.

Some embodiments of the invention also relate to a rotation body of a rotation unit for a surveying device, in particular for a laser scanner, the rotation body being adapted to be mounted on the surveying device for providing defined emission and reception of measuring light by rotation around a rotation axis, the rotation axis being defined by a particular design, in particular by shape and dimension, of the rotation body, wherein the rotation body comprises at least one slanted scanning mirror which is arranged tilted relative to the rotation axis and provides defined deflection of the measuring light.

The rotation body comprises at least one deflecting surface each of which provides defined deflection of an optical axis of an assigned projector, the deflecting surface differs from the scanning surface. If two or more deflecting surfaces are provided, at least two deflecting surfaces are arranged relative to each other so that each of the surfaces lies on a different lateral face of a virtual polygonal pyramid defined thereby.

According to particular embodiments of the rotation body, the rotation body can be designed according to any particular embodiment described above in context of the surveying device. Such particular design is to be understood as not being limited to specific design of the body itself but has to be understood as including e.g. realisations of the deflecting surfaces or the like.

In one embodiment the surveying device comprises at least one camera fixedly arranged with the support structure, in particular in the support structure, defining a particular imaging optical axis and configured to acquire image information related to the scene. The at least one camera and the rotation body may be designed so and arranged relative to each other so that only in a predetermined (alternative) range of alignment of the rotation body around the rotation axis the imaging optical axis of the at least one camera is deflected by the at least one deflecting surface. A field of view of the at least one camera can be deflected and defined by the deflection of the optical axis so that the field of view comprises a defined field angle around the rotation axis, and basically parallax-free image acquisition is providable by means of the at least one camera in cooperation with the deflecting surface, in particular wherein an image is capturable as if the entrance pupil of the at least one camera appears identical with a nodal point of the surveying device.

Such arrangement allows to also project and acquire optical information by means of the at least one deflecting surface. Projection and acquisition may relate on an actual alignment or orientation of the rotation body, i.e. if the optical axis of the projector or the imaging optical axis of the camera is deflected in desired manner. If the optical axes are designed coaxial both processes may be available simultaneously.

Some embodiments of the invention also relate to a method for projecting a light pattern onto a scene by use of a laser scanner. The method comprises
  a) performing a first three-dimensional scan of the scene,
  b) generating a first cloud of measuring points from the first three-dimensional scan, c) in particular generating a three-dimensional model based on the first cloud of measuring points,
  d) augmenting the information of the first three-dimensional scan or the three-dimensional model with projection data, wherein the projection data take a specific spatial relationship to the three-dimensional model, and therewith providing an augmented three-dimensional model,
  e) projecting the projection data in the form of a light pattern onto the scene based at least in part on the augmented three-dimensional model.

In one embodiment the projection data are one or more of: three-dimensional objects, textual information, markings, and animated objects.

In one embodiment the projection data or the augmented three-dimensional data may be at least partly based on an earlier scan of an object the data is supposed to be projected onto. Such projection data may be a point cloud or further processed data (smoothed or cross-linked surface data). By that, structures which may be hidden by e.g. plastering, paint or further installations can be visualised for indication of changes of the object.

In a further embodiment of the method, the method has, between steps d) and e), the following further steps:
  d*) performing a second three-dimensional scan of the scene,
  d**) generating a second cloud of measuring points from the second three-dimensional scan,
  d***) referencing the first and the second cloud of measuring points, therewith calculating a difference in position and orientation regarding the first scan and the second scan.

In another embodiment of the method, projecting according to step e) is further based on the difference in position and orientation.

In an embodiment of the method, the projection data are computed to the light pattern based on the first cloud of measuring points, or based on the difference in position and orientation.

In a further embodiment of the method, the light pattern is a video sequence.

An alternative method relates to projecting a light pattern onto a scene by use of a laser scanner. This method comprises
  a) performing a first three-dimensional scan of the scene,
  b) generating a first cloud of measuring points from the first three-dimensional scan,
  c) retrieving geometric reference information from a digital (CAD) model,
  d) matching the first cloud of measuring points to the reference information in terms of position and orientation by a particular algorithm (e.g. fitting to surfaces or registration of point cloud to a synthetic point cloud),
  e) retrieving augmented model data based on the matching or based on a match of the reference information with an alternative model, and
  f) projecting data of the augmented model.

BRIEF DESCRIPTION OF THE DRAWINGS

The devices according to the invention are described or explained in more detail below, purely by way of example, with reference to working examples shown schematically in the drawings. Specifically.

DETAILED DESCRIPTION

Figure 1A:
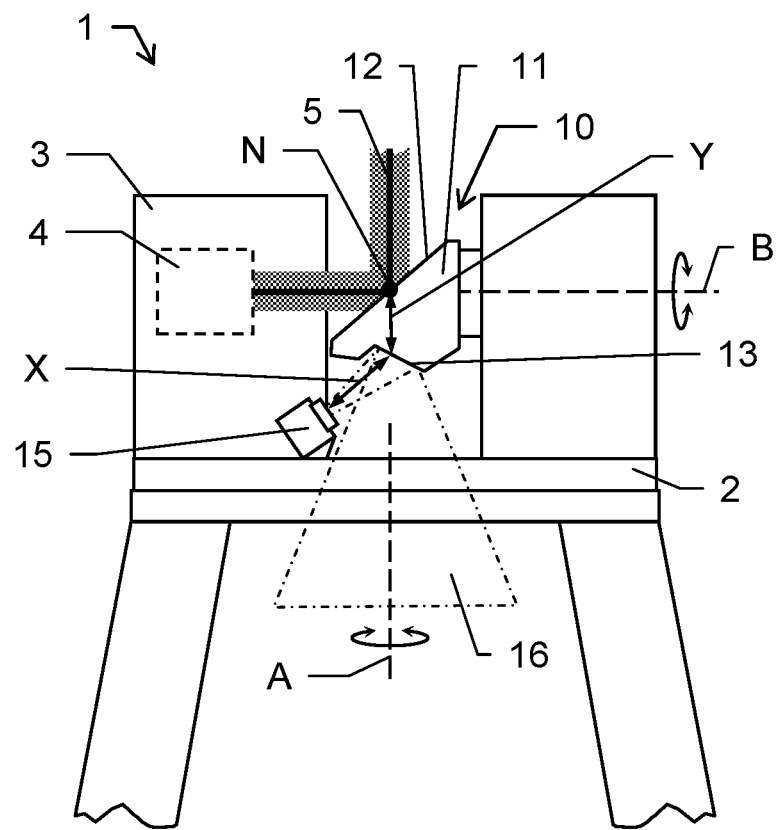
FIGS. 1a-c show a first embodiment of a surveying device embodied as a laser scanner according to the invention in different perspectives.

FIG. 1a shows a first embodiment of a laser scanner 1 according to the invention. The scanner 1 is shown here in a front-view perspective. The scanner 1 comprises a base 2 and a support unit 3 (scanner frame), wherein the base 2 defines a base axis A and the support unit 3 is arranged onto the base 2 and mounted rotatable around the base axis A. A rotational state of the support unit 3 relative to the base 2 is determinable by means of an angle encoder.

The support structure 3 defines and provides a scanning axis B which is aligned basically orthogonal to the base axis A. A rotation unit 10 is provided with the laser scanner 1 and arranged at the support structure 3 and mounted rotatable around the scanning axis B. The rotation unit 10 comprises a rotation body 11 with a scanning mirror 12 arranged tilted relative to the scanning axis B. In addition, the rotation body 11 or an axis by means of which the rotation body 11 is hold and rotated is coupled to an encoding unit which provides (continuous) determination of an angle of rotation of the rotation body 11 around the scanning axis B, i.e. relative to the support unit 3.

Furthermore, the scanner 1 comprises a distance measuring unit 4 which provides emission of measuring light 5 and detection of reflected measuring light 5 so that a distance to an object or scene at which the measuring light is reflected can be determined. The distance measuring unit 4 preferably comprises a light emitting unit like a laser diode and a photosensitive detector for detecting backscattered light. Both emitting measuring light and receiving measuring light are deflected by means of the scanning mirror 12 and guided to an object to be measured or to the distance measuring unit 4 respectively. It is to be understood that determination of such distances can be realised by several methods well known to one of ordinary skill in the art, e.g. distances may be determined by use of the time-of-flight principle.

As can be seen from the combination of the rotatable elements and the distance measuring unit 4, the laser scanner 1 is designed for scanning a scene or scanning region as the rotation body 11 for redirecting a measuring beam (which is sent to an object as a transmission beam and the reflection of which is received as reception beam by the distance measuring unit 4) is rotating around the horizontal scanning axis B, and as a body 3 of the laser scanner 1 is rotating around the vertical base axis A. By sending out and receiving measuring light (e.g. laser signals) at respective positions of the components rotating around said axes A and B, thereby applying EDM (electronic distance measurement) techniques known from prior art, such as travel time measurement, the laser scanner 1 is enabled to "sense" the surface of a scene or object and to store the scanned points characterised by their three-dimensional coordinates. The distances detected are assigned to angle coordinates which are provided by mentioned encoders (angle sensors) arranged around the vertical axis and the horizontal axis. Based on the scan, a three-dimensional point cloud can be generated, out of which a CAD (computer aided design) model may be created. Such CAD model may be regenerated with means of a surface recognition algorithm so that the CAD file is simplified by having unnecessary points reduced. Said CAD model generating may take place on a computer or process unit inside the laser scanner, or e.g. on an external computer or cloud computer by using the "raw data", i.e. the point cloud.

According to the shown embodiment of the invention, the scanner 1 comprises three projector sub-units (projectors), wherein only one projector 15 of those three projectors is exemplarily shown and described with FIG. 1*a* due to perspective issues. The description for that projector 15 can be transferred to all respective projectors arranged.

Correspondingly, the rotation body 11 comprises three deflecting surfaces, wherein only one deflecting surface 13 of those three deflecting surfaces is exemplarily shown and described with FIG. 1*a* due to perspective issues. The description for that deflecting surface 13 can be transferred to all arranged deflecting surfaces. The surface may be provided by a plane mirror at the rotation body 11.

The projector 15 is arranged fixedly with the support structure 3 and thus defines an optical axis with defined position and orientation relative to the scanner frame 3.

The projectors and the deflecting surfaces are designed so and arranged relative to each other so that—in a predetermined orientation of the rotation body 11 relative to the support structure 3 (as shown in FIG. 1*a*)—each of the projectors corresponds with one respective of the deflecting surfaces in desired manner. This means that the field of view of projector 15 (exemplarily) is deflected by its corresponding deflecting surface 13 and thus defined in a manner to provide a field of view 16 having a comparatively great field angle in rotation direction of the rotation body 11 (rotation around the rotation axis B; elevation angle) and a smaller field angle in azimuthal direction.

The same applies for the remaining two projectors and deflecting surfaces, wherein each of those two more projector-surface-pairs provides projection of a light pattern or of parts thereof according to a comparatively large field angle in rotation direction of the rotation body.

The three projectors and the three deflecting surfaces are furthermore arranged so that the pairs of projectors and deflecting surfaces define particular fields of view 16,17,18 which overlap to some extent in rotation direction of the rotation body, i.e. two adjacent fields of view both cover a particular and common angular region with reference to the elevation angle. Such design of the fields of view 16,17,18 can be seen in FIG. 1*b* which depicts the laser scanner 1 in a side view. FIG. 1*c* also shows covering of a wide-angle projection region 19 by means of three overlapping fields of view 16,17,18, wherein the scanner 1 is shown in a perspective view.

As a result of such arrangement of projectors and deflecting surfaces, the elevation field angle of pattern projection 19 results to more than 150°. By rotating and holding the rotation body 11 in the predetermined orientation relative to the fixed projectors and swivelling the support structure 3 around the base axis A a successive projection can be generated over a 360° rotation of the support structure 3 e.g. in a certain number of steps or continuously. The projection is controlled to be adapted or to move along with the azimuth rotation, only i.e. a part of a desired projection pattern may be projected according to an actual azimuthal orientation of the scanner 1.

According to the invention, a (quasi) parallax-free arrangement can be provided by such particular design of the scanner 1, i.e. by the relative arrangement of projectors and deflecting surfaces and shape and dimension of the rotation body 11. The projector 15 is arranged with a defined distance X to the deflecting surface, i.e. the distance X along the optical axis of the projector 15 from the exit pupil of the projector 15 to the intersection point of the optical axis and the deflecting surface 13 is well known (at least in a predetermined alignment of the rotation body 11 as shown). Such distance X is chosen so that it basically corresponds to the distance Y from said intersection point to the nodal point N of the laser scanner 1. The nodal point N is defined by an intersection of the measuring light—or more particular of an optical axis defined by the measuring light—with the scanning mirror 12 (in particular, this point is coincident with the intersection of the A-Axis and the B-Axis). That provides projecting patterns with the projector 15 as if the centre of projection (exit pupil of the projector 15) for projection is identical with the nodal point N for scanning.

A main advantage of such design is that pattern data is projected with a reference point which corresponds to the reference point of the scanning data. Therefore, data or coordinate transformations can be avoided or at least be reduced. A correction of parallaxes is also not required or at least greatly simplified because any significant projection-scanning-parallax is initially avoided by the specific structural design of the system. Moreover, the projector is enabled to project onto the same areas and points which can be measured by the scanner, i.e. there don't exist any occlusions of points, which could be scanned but could not be projected.

According to an alternative embodiment of the laser scanner (not shown) the projectors and the deflecting surfaces are arranged so that there is a defined but small parallax provided in order to generate a small overlap between the fields of view of the projectors. To avoid, that a first projector "sees" not only via a first deflecting surface (mirror or prism) to the object space but beyond its edges also via a part of a second mirror (pupil overlap), a defined "blocking" gap between two adjacent mirrors is provided. This arrangement can provide a respective parallax of e.g. 5 mm to provide a fields of view overlap, without introducing a pupil overlap at the deflecting surfaces. Such design with small parallax of e.g. 5 mm, is still considered as a "quasi parallax-free" system and provides basically the advantages mentioned above.

The laser scanner 1 may further comprise an imaging unit with at least one camera for capturing image information related to a scanned object (not shown). The at least one camera may be arranged in the support structure 3 with corresponding specifications compared to the at least one projector. The entrance pupil of the camera may be arranged so as it appears identical (with respect to its position) with the nodal point. In other words, the camera may provide parallax-free image acquisition by means of cooperation with at least one of the deflecting surfaces—depending on a respective (alternative) alignment of the rotation body.

A main advantage of such design is that image data is generated with a reference point which corresponds to the reference point of the scanning data. Therefore, data or coordinate transformations can be avoided or at least be reduced. A correction of parallaxes is also not required or at least greatly simplified because any significant imaging-scanning-parallax is initially avoided by the specific structural design of the system. Moreover, the camera is enabled to capture the same areas and points which can be measured by the scanner, i.e. there don't exist any occlusions of points, which could be scanned but could not be imaged.

Figure 2:
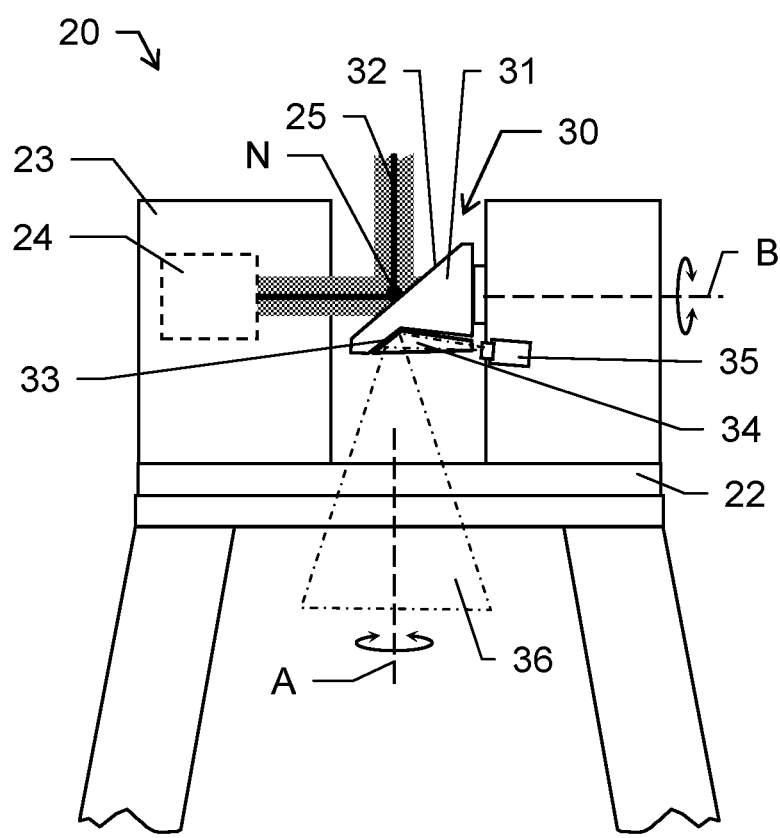
FIG. 2 shows a second embodiment of a surveying device embodied as a laser scanner according to the invention.

FIG. 2 shows a further embodiment of a laser scanner 20 according to the invention. The scanner 20 again comprises a base 22, a support structure 23 (scanner frame) and a rotation unit 30 with a rotation body 31. A laser emitting unit 24 having an electronic distance measurement device is arranged in the support structure 23 and provides emitting and receiving of a measuring laser beam 25.

Figure 1B:
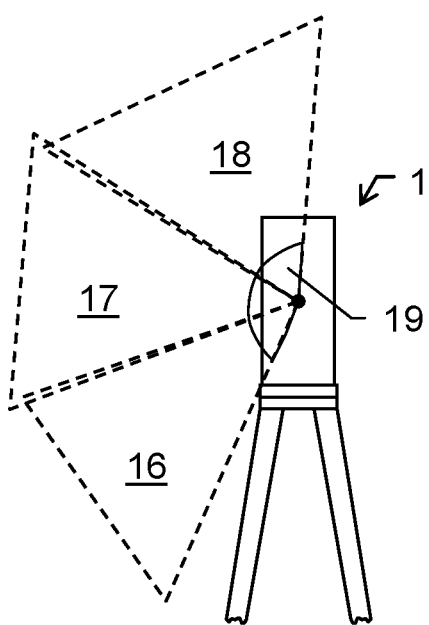
Figure 1C:
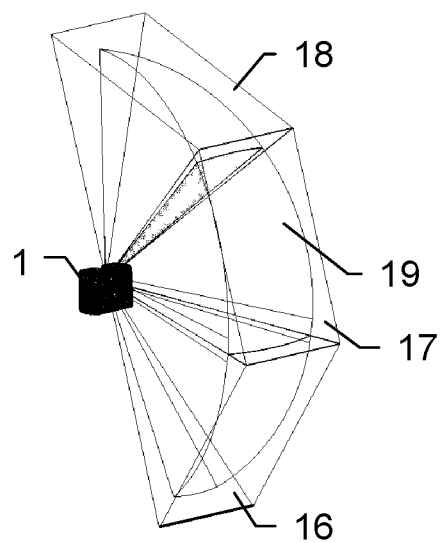

The main difference in contrast to the embodiment shown with FIGS. 1a-c here is the design of the rotation body 11, of the deflecting surfaces 33 and of the arrangement of the projector 35.

The rotation unit 30 comprises a prism 34, e.g. made of glass or PMMA (Poly (methyl methacrylate)), wherein one of the surfaces 33 of the prism 34 is coated to provide a reflecting surface 33 which represents the deflecting surface of the rotation unit 30. In particular, the coating is made of highly reflecting material. The prism 34 preferably provides a refracting index of n>1.4 which itself provides an extension of the optical distance. This allows designing the rotation body 31 smaller and of less weight as the distance from the nodal point N to the intersecting point of optical projector axis and coated mirror surface 33 can be chosen to be significantly smaller compared to the embodiment above, while simultaneously maintaining the distance between the intersecting point of optical projector axis with coated mirror surface 33 and the exit pupil location of the lens.

As can be seen, the projector 35 here is fixedly arranged on the same side of the support structure 23 as the rotator is arranged at. Of course, depending on the design of the optical arrangement, the projector 35 can alternatively be arranged on the opposite side.

Advantages of the shown embodiment are e.g. that the diameter of the rotor increase only marginal compared to rotors known from the art. The projector 35 can be mounted into frame 23 with comparatively low effort, wherein connection of the projector 35 remains quite simple. The projector lens can be hidden and protected by a rotor cover so that the projector is not directly visible from outside. By providing quite similar density of glass (prism) and aluminum (rotor) balancing of the rotor is simplified.

According to a preferred embodiment, the surface(s) between two prisms can be black painted to avoid an overlap of the pupil from one projector with the pupil of a second projector.

The prism 34 can be embodied as a single part. This means for providing three deflecting surfaces there are arranged three individual prisms next to each other at the rotation body 31. In an alternative embodiment, there is built one prisms component, wherein such component provides all of the three deflecting surfaces and the surfaces are arranged with defined orientation relative to each other. The deflecting surfaces are preferably arranged so that they lay on respective lateral faces of a virtual pyramid which is defined by the surfaces.

In one embodiment (not shown) the laser scanner comprises a camera which is arranged in the support structure 23 next to the projector 35. The camera is arranged in a manner so that an optical axis of the camera is deflected by the surface 33 if the rotation body 31 is brought into a corresponding orientation providing a respective interaction. Such image-capturing orientation differs from a predetermined range of projection-alignment of the rotation body 31 around the rotation axis B by a defied angular range.

Figure 3:
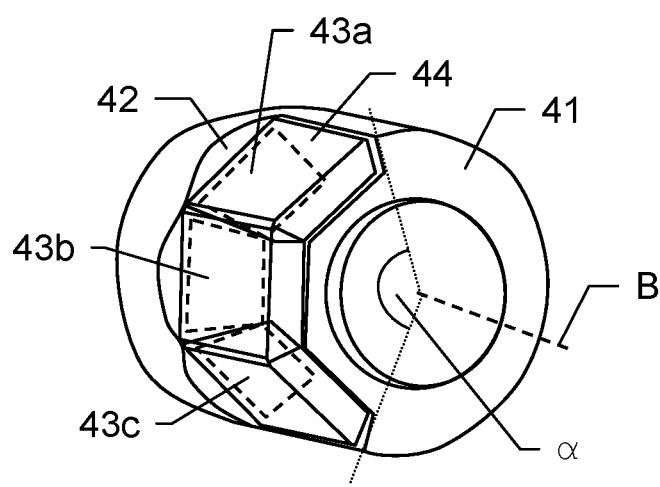
FIG. 3 shows an embodiment of a rotation body of a surveying device according to the invention.

FIG. 3 shows an embodiment of a rotation body 41 of a rotation unit for a laser scanner according to the invention. The rotation body 41 is shown from a backside perspective, i.e. a scanning mirror (not shown) is arranged on the opposite side of the body 41 (as exemplarily can be seen in the embodiment shown with FIG. 2). An axis of rotation B is defined by the shape and dimensions of the rotation body 41. The rotation body 41 further comprises a recess 42 which extends over a defined angular range a.

A deflecting component 44 is arranged in the recess 42 and is built in prismatic manner. In the shown embodiment the deflecting component 44 is built as a single part which comprises three segments which are arranged in defined orientation tilted relative to each other. Each segment comprises a reflecting mirror (deflecting) surface 43a,43b,43c. The mirror surfaces 43a,43b,43c are arranged tilted relative to the rotation axis B. In a preferred embodiment, the mirror surface normals 43a,43b,43c enclose identical angles with said axis B. Furthermore, the deflecting component 44 is designed so that the mirror surfaces 43a,43b,43c are arranged tilted relative to each other in defined manner. In particular, the mirror surfaces 43a,43b,43c are arranged so that they lay on different lateral faces of a polygonal pyramid which is defined by the surfaces 43a,43b,43c.

The mirror surfaces 43a,43b,43c are provided by a respectively coated surface of each segment of the component 44.

In an alternative embodiment, the deflecting component 44 comprises three prisms, wherein one surface of each of the prisms is provided as a deflecting surface. The prisms are arranged adjacent relative to each other. In particular, each prism is glued on the recess 42.

The deflecting surfaces 43a,43b,43c are preferably designed so that there is a defined gap between two successively arranged surfaces 43a,43b,43c.

In particular, such surfaces of two adjacent prisms or segments which are facing each other are black painted in order to prevent light beams of being deflected from a non-assigned projector (no pupil overlap).

In such concept variant one sees three glass prism elements with a coated mirror, which can mirror the exit pupil to the nodal point. With such glass prisms one can artificially increase the distance X (FIG. 1) by the larger refractive index of glass compared to air without increasing Y or introducing a larger parallax. The setup thus can be quasi-parallax-free.

Figure 4:
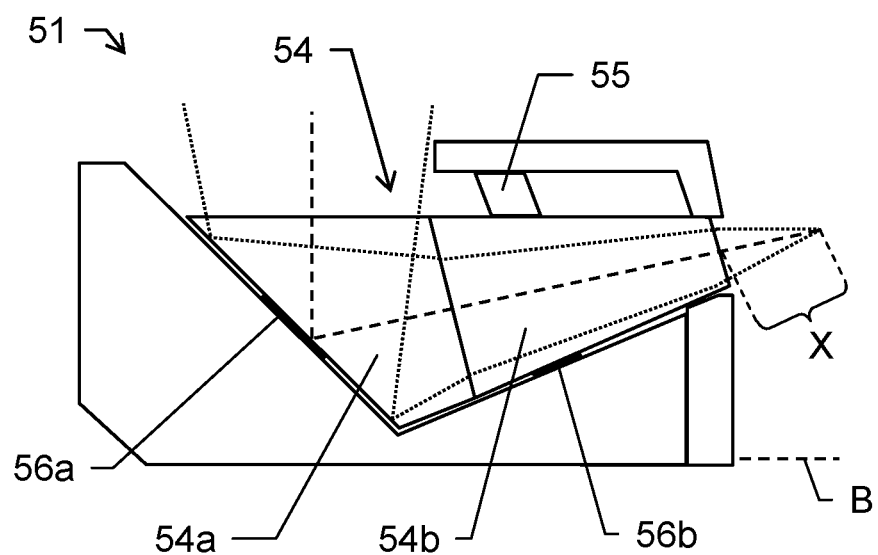
FIG. 4 shows a further embodiment of a rotation body of a surveying device according to the invention.

FIG. 4 shows an embodiment of a rotation body 51 (in part; crosscut) of a surveying device, wherein the rotation body 51 is designed to be rotated around the rotation axis B. The rotation body 51 comprises at least one deflecting member 54 in form of a prismatic element which comprises two optical portions 54a and 54b. The portions 54a, 54b are built with different optical properties, in particular with different refractive indices. In particular, the second portion 54b comprises a significant greater refractive index than the first portion 54a. The first optical portion 54a may comprise a refractive index of about 1.49 and the second optical portion 54b may comprise a refractive index of about 1.9. By having the second member 54b with a refractive index greater than the refractive index of the first member 54a an optical distance can be (artificially) extended as well. A more compact design of the rotation body becomes possible. By that, the distance X which represents a distance between the exit surface of the deflecting member 54 and an exit pupil of a frame projector can be enlarged by a factor out of a region of 30% to 50% compared with a monolithic prism element having a refractive index of about 1.49.

The present embodiment also shows a fixation 55 for the deflecting member 54. It is to be understood that a two-part deflecting member 54 can also be arranged (e.g. glued) without such fixation 55 and—on the other hand—that alternative prism elements can be combined with such fixation. The fixation 55 for example comprises a spring which introduces a force in basically opposite direction to a centrifugal force which occurs on rotation of the rotation body 51. Such design provides to hold the deflecting member 54 in defined position at the rotation body.

There may also be provided a three-point interface 56a, 56b to carry the deflecting member 54 and to prevent the deflecting member 54 from being deformed due to external or internal forces, in particular due to rotation of the body 51.

Figure 5:
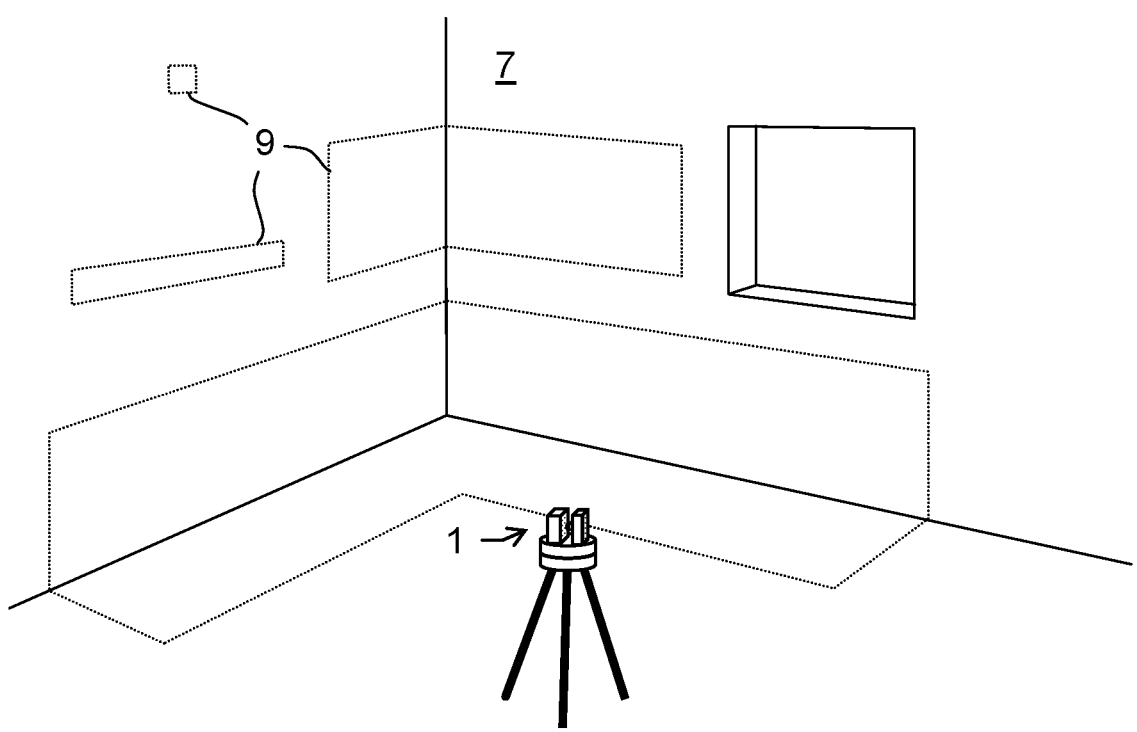
FIG. 5 shows a projection of a light pattern with a surveying device according to the invention.

FIG. 5 shows a pre-scanned room scene 7, wherein the laser scanner 1 is set up in erected state in the room with a random position and orientation, e.g. by a craftsman.

The laser scanner may have "sensed" the surface of the scene and stored the scanned points characterized by their three-dimensional coordinates. The distances detected are assigned to solid angles which are provided by angle sensors arranged around the vertical and the horizontal axis. During the room scan, a three-dimensional point cloud is generated, out of which a CAD (computer aided design) model may be created. Such CAD model may be regenerated with means of a surface recognition algorithm so that the CAD file is simplified by having unnecessary points reduced. Said CAD model generating may take place on a computer or process unit inside the laser scanner, or e.g. on an external computer or cloud computer by using the "raw data", i.e. the point cloud.

Projection data stored, imported or created on a PC or on the scanner 1 (with help of wirelessly connected auxiliary devices like a tablet, mouse and/or keyboard) may be fitted into the measured point cloud or into the CAD model created out of the measured points, e.g. by an architect. In the example shown, a kitchen unit with cupboard and exhaust hood are to be positioned into the geometry of the room corner. The design model is integrated into the room geometry with a spatial relationship, such that every coordinate of the model P is "anchored" to the room geometry. After this model merge has been done, the combined model (augmented three-dimensional model) is stored on the laser scanner.

The augmented three-dimensional model, which may utilize a lot of memory, may be reduced to characteristic data so that the whole three-dimensional point cloud is not necessary to be comprised anymore. In this case, the projection data are linked to minimal information on where to project the patterns. For example, the measuring points may be reduced to alignment features, such as edges in the room or elements like windows.

The laser scanner 1 then can "re-orientate" itself by a self-referencing on the basis of yet another scene scan. Since the room shape has not changed, in particular since the position of objects suitable to act as reference objects (like the window in the shown example) has not changed, the laser scanner 1 may match the first and the second room point cloud and therewith determine the relative shifts and tilts. Also, position markers (e.g. stuck to the wall) may be used for referencing the old and the new position of the scanner. Now that the laser scanner 1 is "aware" of its (new) position and orientation relative to the room scene, it may also determine solid coordinates (angle position of the body and/or the directing unit) for the projection data by way of a coordinate transformation.

A laser light pattern 9, e.g. as a result of an extraction of the projection data, may now be projected onto the scene 7. The pattern 9 is the outline on the walls of the planned kitchen. With this projection, it may be visualised at the real scene where a planned construction will be positioned. Here the whole outline 9 of the kitchen is shown, however, —dependent on the angle of projection of the laser projector and dependent on the position of the laser scanner relative to the surfaces of the scene—only part of the pattern may be able to screen. Further information, such as positional, height or length declarations, may be extracted from the projection data or may be the projection data. These information are then projected as part of the pattern 9.

As a further example, construction steps with parameters as pattern 9 may be projected. With their projection on the wall, a construction worker has a visual support when accomplishing the construction steps. It is, particularly, possible to immediately perform the drills/milling at the right position, or to trace the pattern with a pencil and perform the steps at a later stage.

Other projection information ("pattern") may be more detailed instruction texts, environmental parameters, tool selection, animations (moved pictures, video sequence) etc.

Although the invention is illustrated above, partly with reference to some specific embodiments, it must be understood that numerous modifications and combinations of different features of the embodiments can be made and that the different features can be combined with each other or with laser scanners known from prior art.

What is claimed is:

1. A surveying device comprising:
a base defining a base axis (A);
a support structure which is arranged to be rotatable around the base axis (A) and which defines a rotation axis (B) which is oriented orthogonally relative to the base axis (A);
an emitting unit for emitting a measuring signal;
a receiving unit comprising a detector for detecting a reflected measuring signal;
a rotation unit mounted on the support structure for providing emission and reception of the measuring signal in defined directions,
wherein:
the rotation unit comprises a rotation body which is mounted so as to rotate around the rotation axis (B) and
the rotation body comprises at least one reflecting scanning mirror which is arranged tilted relative to the rotation axis (B) and provides defined deflection of the measuring signal; and
a controlling and processing unit,
wherein:
the surveying device comprises at least one projector fixedly arranged with the support structure, defines a particular optical axis, and is configured to direct a light pattern at a scene,
the position and shape of the pattern are controllable by the controlling and processing unit,
the rotation body comprises at least one deflecting surface which is independent and spatially separated from the scanning mirror, and
the at least one projector and the rotation body are configured and arranged relative to each other in a predetermined range of alignment of the rotation body around the rotation axis (B),
the optical axis of the at least one projector is deflected by the at least one deflecting surface,
a field of view of the at least one projector is deflected and defined by the deflection of the optical axis so that the field of view comprises a defined field angle around the rotation axis (B), and
a parallax-free light pattern projection is providable with the surveying device.

2. The surveying device according to claim 1, wherein the rotation body and the at least one projector are arranged and designed so that an emission axis for the measuring signal and the deflected optical axis of the at least one projector lie in a common plane which is oriented at least orthogonal relative to the rotation axis (B).

3. The surveying device according to claim 1, wherein the surveying device comprises at least two projectors which are fixedly arranged on the support structure,
each projector defining a particular optical axis,
the rotation body comprises at least two adjacent deflecting surfaces,
the at least two deflecting surfaces are arranged tilted relative to each other, in particular so that each of the deflecting surfaces lies on a different lateral face of a virtual pyramid defined thereby,
each of the at least two projectors is assigned to one of the at least two deflecting surfaces such that at least two pairs of one of the projectors and one of the deflecting surfaces are provided, and
the projectors and the rotation body are designed so and arranged relative to each other so that in the predetermined range of alignment of the rotation body around the rotation axis (B) a combined and continued wide-angle field of view around the rotation axis (B) is provided.

4. The surveying device according to claim 3, wherein the at least two deflecting surfaces are arranged with a defined distance between two successively arranged adjacent deflecting surfaces.

5. The surveying device according to claim 3, wherein the continued wide-angle field of view covers an angle of at least 90° around the rotation axis (B).

6. The surveying device according to claim 3, wherein each of the fields of view which is defined by a deflection by means of the assigned deflecting surface in the predetermined alignment range partly covers the wide-angle field of view, wherein an overlap of adjacent fields of view is provided.

7. The surveying device according to claim 1, wherein the controlling and processing unit provides a projection functionality which is configured so that each of the at least one projector projects at least a part of the entire light pattern, wherein the rotation body is in the predetermined range of alignment, and the controlling and processing unit is configured to control a step of rotating the rotation body around the rotation axis (B) so that the rotation body is brought in the predetermined range of alignment.

8. The surveying device according to claim 1, wherein the at least one projector and the rotation body are designed so and arranged relative to each other so that in the predetermined range of alignment of the rotation body an optical distance from the at least one deflecting surface to a respective exit pupil of the respectively assigned at least one projector along the optical axis of this projector corresponds to an optical distance from an intersection point of the optical axis with the deflecting surfaces to a nodal point of the surveying device.

9. The surveying device according to claim 1, wherein at least one of the at least one deflecting surfaces is provided by a reflecting mirror, wherein the reflecting mirror
is provided by one planar surface of the rotation body, wherein the planar surface is formed as one part with the rotation body,
is provided as a separate mirror element attached to the rotation body, or
is provided by a hyperbolic mirror.

10. The surveying device according to claim 1, wherein at least one of the at least one deflecting surfaces is a coated mirror surface of a prismatic element, wherein the prismatic element is attached to the rotation body.

11. The surveying device according to claim 1, wherein the rotation body is designed so that a reflecting surface of the scanning mirror faces in an opposite direction of at least one of the deflecting surfaces, the rotation body is designed so that the scanning mirror is arranged on a front side of the rotation body and the deflecting surfaces are arranged on the backside of the rotation body, or the rotation body is arranged in a transparent cover which is designed to provide at least a first transmission window for emission and reception of the measuring signal and a second transmission window for emission of light for projecting the light pattern by the at least one projector.

12. The surveying device according to claim 1, wherein the predetermined range of alignment is provided by only one particular rotation region around the rotation axis (B).

13. The surveying device according to claim 1, wherein the projector is:
- a digital projector,
- a monochromatic laser projector, or
- a polychromatic laser projector, and
the projector comprises a laser source and an optical matrix element or a continuously deflecting element generating a light pattern.

14. The surveying device according to claim 1, wherein:
at least one camera
is fixedly arranged with the support structure,
defines a particular imaging optical axis, and
is configured to acquire image information related to the scene, wherein:
the at least one camera and the rotation body are designed so and arranged relative to each other in a defined range of alignment of the rotation body around the rotation axis (B),
the imaging optical axis of the at least one camera is deflected by the at least one deflecting surface,
a field of view of the at least one camera is deflected and defined by the deflection of the optical axis so that the field of view comprises a defined field angle around the rotation axis (B), and
parallax-free image acquisition is providable by means of the at least one camera.

15. A method for projecting a light pattern onto a scene by use of a laser scanner of claim 1, the method comprising:
performing a first three-dimensional scan of the scene,
generating a first cloud of measuring points from the first three-dimensional scan, augmenting information of the first cloud of measuring points or the first three-dimensional scan with projection data, wherein the projection data take a specific spatial relationship to the first three-dimensional scan, and therewith providing an augmented three-dimensional scan,
projecting the projection data in the form of a light pattern onto the scene based at least in part on the augmented three-dimensional scan.

* * * * *